R. PARKER.
BELTING AND PROCESS OF MAKING THE SAME.
APPLICATION FILED SEPT. 11, 1913.
1,099,763.
Patented June 9, 1914.
2 SHEETS—SHEET 1.
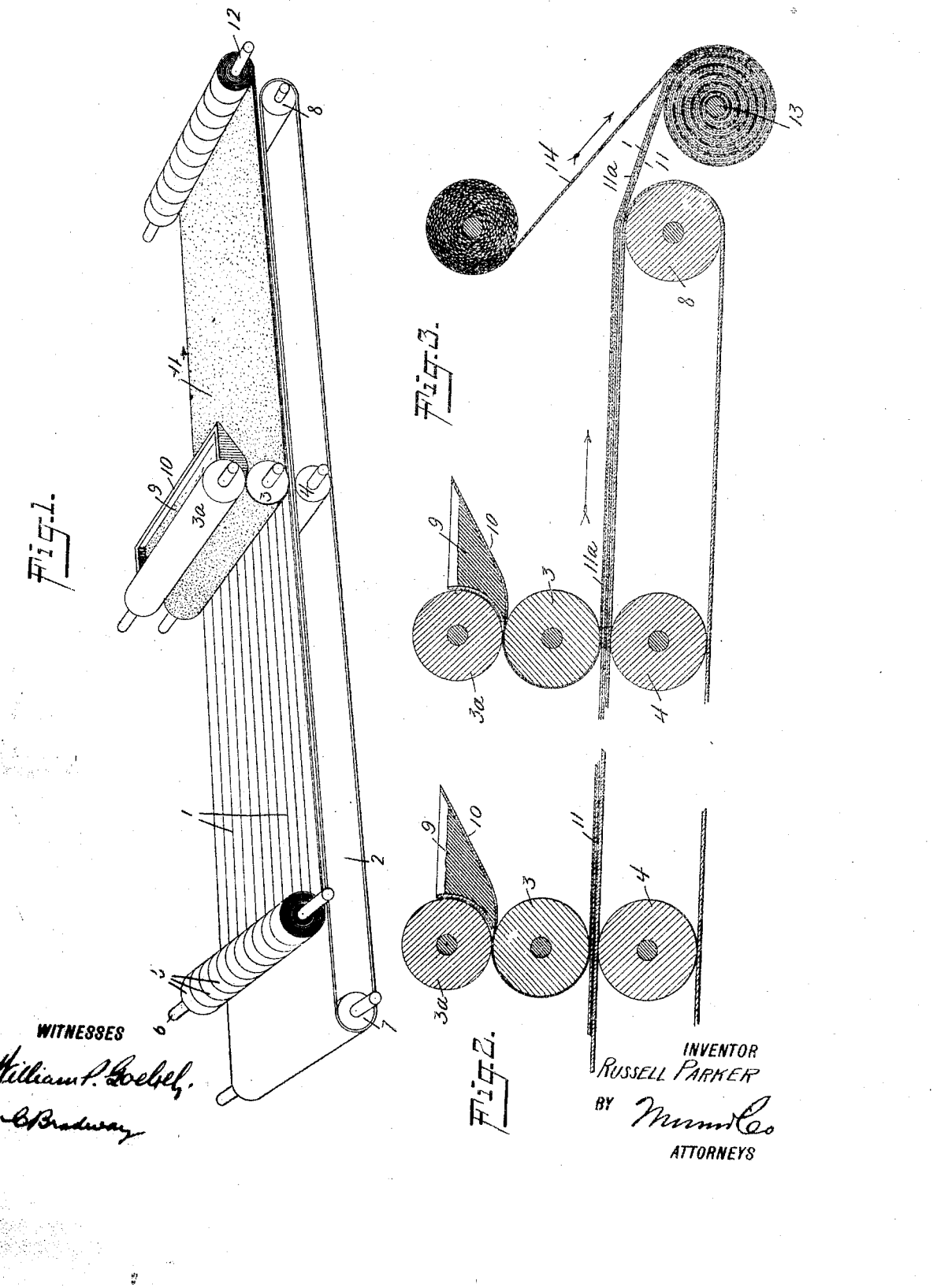
WITNESSES
INVENTOR
RUSSELL PARKER
BY
ATTORNEYS

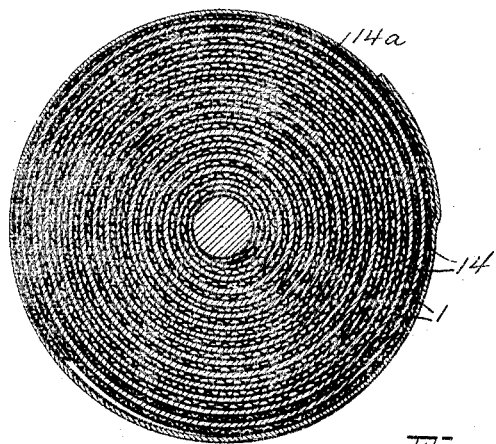
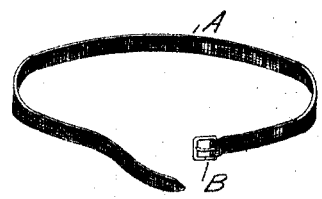
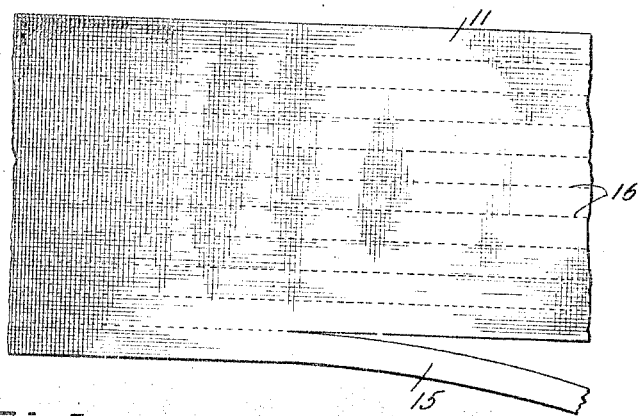
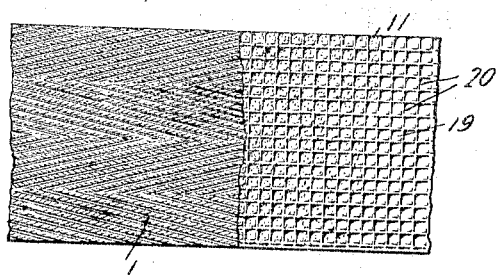
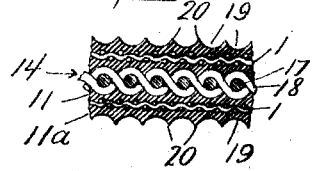

ns.

UNITED STATES PATENT OFFICE.

RUSSELL PARKER, OF NEW YORK, N. Y., ASSIGNOR TO PARKER, STEARNS & COMPANY, OF BROOKLYN, NEW YORK, A CORPORATION.

BELTING AND PROCESS OF MAKING THE SAME.

1,099,763.

Specification of Letters Patent.   Patented June 9, 1914.

Application filed September 11, 1913. Serial No. 729,261.

*To all whom it may concern:*

Be it known that I, RUSSELL PARKER, a citizen of the United States, and a resident of the city of New York, borough of Brooklyn, in the county of Kings and State of New York, have invented a new and Improved Belting and Process of Making the Same, of which the following is a full, clear, and exact description.

This invention relates to belting and the method of making the same, the belting being especially useful as an inner belt to be worn by women for the purpose of holding down the shirt waist and supporting the skirt, the belting having its opposite faces covered by rubber which, in the process of making the belting, is given a roughened surface so as to provide a tenacious grip on the shirt waist and skirt. Obviously the belt can be used on trousers to engage and hold the shirt down when an outer belt is used to support the trousers. Furthermore, the belt can be used for garters, and in fact it may be used for driving belts and other purposes.

The invention has for its general objects to improve and simplify the construction of belting and the method whereby the same is produced, so that the manufacture of the belting can be carried on inexpensively, expeditiously and in an effective manner.

In carrying out the invention a plurality of strips of fabric or tapes are laid upon an endless apron or conveyer and fed by the latter through and between calendar rolls which apply to the entire group of feeding tapes a coating or facing of rubber, whereby a coherent web is produced which, when completed, may again pass through the calendar rolls in such a manner as to apply a rubber facing to the other side of the tapes. This sheet or web is then wound on a mandrel simultaneously with a roughening or impressing element, such as a strip of South Sea Island duck, the meshes of which serve to make impressions in the rubber facings of the tapes in the vulcanizing process. After the rubber-covered tape web and duck are wound on the mandrel the roll is covered by a damp cloth and then placed in a vulcanizer so that the rubber will be cured, and during the vulcanizing process the rubber will not only be caused to firmly adhere to the tapes, but the outer surfaces of the rubber facings will be given an impression which is the counterpart of the surface of the duck, that is to say, the rubber facing will have rows of depressions formed therein, with comparatively sharp edges or ridges between adjacent depressions, so that a decidedly roughened surface is the result. After the vulcanizing is completed the roll of vulcanized fabric and duck is unwound and the fabric is split into strips of belting by pulling or otherwise separating one tape from the next. No cutters are required, since the only connection between adjacent tapes is the rubber facing, which readily tears under pressure. The resulting product is a belting having a tape or other fabric body with a rubber facing on one or both sides and extending from one edge to the other, such rubber facing being provided with closely-arranged rows or depressions with ridges between adjacent depressions. The belting has somewhat the feeling of a file, with the exception that the teeth are yielding or elastic.

For a more complete understanding of the invention reference is to be had to the accompanying drawings taken in connection with the following description and claims appended hereto.

In the accompanying drawings, which illustrate one embodiment of the invention, and wherein similar reference characters indicate corresponding parts throughout the several views, Figure 1 is a perspective view of the apparatus for applying a rubber facing to a plurality of tapes simultaneously; Fig. 2 is a sectional view showing the application of the first rubber facing to the tape; Fig. 3 is a similar view showing the application of the other facing of rubber to the tapes and the winding of the rubber-faced tapes and a roughening or impressioning element on a mandrel; Fig. 4 is an enlarged sectional view of the roll formed by the tape and impressioning element of the mandrel and the roll covered with a dampened cloth; Fig. 5 is a perspective view of an inner belt made from the improved belting; Fig. 6 is a fragmentary view of the sheet or web formed by the vulcanized tapes, one of the tapes being partly separated; Fig. 7 is an enlarged view of a portion of a piece of tape or belting with a part of the rubber facing removed; and Fig. 8 is a sectional view drawn on an enlarged scale to show the manner of forming the roughening surface in the rubber facings of the tapes.

Referring to the drawings, the tapes or strips of fabric 1, each of which serves to form the body of a belt, are fed by means of an endless apron or conveyer 2 to and between calendar rolls 3 and 4 that operate to apply a rubber facing to all the tapes 1. The tapes are in the form of rolls 5 supported on a shaft or mandrel 6 from which the tapes unwind in feeding to the calendar rolls. The endless belt constitutes a support for the tapes by the latter resting on the upper flight or run of the endless belt, which latter passes around guide pulleys 7 and 8 which may be suitably driven to cause the endless belt to travel. Coöperating with the roll 3 is a roll 3ª so arranged that soft rubber 9 will feed from a hopper or equivalent holder 10 to the rolls 3 and 3ª, which cause the rubber to be spread out in a thin sheet of uniform thickness for application to the upper surfaces of the tapes or strips 1. The rolls force the rubber facing 11 firmly into the meshes or pores of the tapes 1, and consequently the tapes and rubber facing are firmly bound together, forming a webbing which is preferably wound on a mandrel or shaft 12 at the delivery end of the endless belt 2. If it is desired to provide a double-faced belting, the mandrel 12 with the roll of webbing or sheet thereon formed by the rubber-faced tapes is placed at the receiving or feeding end of the machine so that the web can be fed forwardly to the calendar rolls by the endless conveyer or belt 2. Obviously the side having the facing 11 is placed in contact with the endless belt 2 so that the uncovered surfaces of the tapes 1 will be in a position to receive a facing of rubber 11ª, as clearly shown in Fig. 2. The rubber-faced fabric as it leaves the conveyer 2 is wound on a mandrel 13, Fig. 3, but at the same time a roughening or impressioning element 14 is wound on the mandrel so that between each convolution of the rubber-faced fabric there will be an intermediate convolution of the impression element 14. Any suitable material may be used as an impression element, such as South Sea Island duck, wire mesh or the like, as the purpose of this element is to form the outer surfaces with the impressions of the mesh or weave of such element. After the fabric and impression elements are wound to form a roll, as in Fig. 4, a damp cloth or equivalent thereof 14ª, is wrapped around the roll, and then the whole is placed in a vulcanizer and subjected to steam pressure for the purpose of curing the rubber. The pressure exerted during the vulcanizing will cause the rubber to set with impressions of the South Sea Island duck in the outer surfaces of the rubber facing. After the curing the fabric and duck are unwound so that the fabric can be separated into strips of belting, as shown in Fig. 6. It will be understood that the tapes or strips of fabric forming the body of the belting are approximately in contact when the rubber facings are applied, and hence adjacent tapes are held together only by the facings. It is merely necessary to pull the adjacent tapes apart in any suitable manner in order to separate the tapes. No cutting means are required for the separation of the tapes, as the rubber readily tears without, however, loosening the rubber facing from the fabric of the tapes. In fact, the rubber facing and fabric adhere so firmly that it is practically impossible to tear off the rubber facing.

In Fig. 6 one of the tapes is shown at 15 in the step of being separated from its adjacent tapes, such tapes being indicated by the dotted line 16.

In Fig. 8, 17 and 18 represent the weft and warp of the impression element, and adjacent convolutions of a tape 1 with the rubber facings 11 and 12 thereon are shown at opposite sides of a single convolution of the impression element 14. From this figure it is clearly shown how the rubber facings take the impression of the mesh or weave of the impression element, and it also shows how a single impression element will cause the roughening of both sides of the belting.

In Fig. 7 the arrangement of the depressions 19 with the sharp ridges 20 between adjacent depressions in the rubber facing is illustrated. It will be noted that the depressions and ridges do not partake of the form of the weaving of the tape 1, but the depressions and ridges are produced solely by the strip of South Sea Island duck or other impressioning material which is wound with the rubber-faced fabric into a roll preparatory to vulcanizing.

In making inner belts from the rubber-faced belting used as above described, the belting is cut into strips long enough to extend entirely around the waist to form an inner belt A, as shown in Fig. 5, and on one end of the strip is applied a buckle or equivalent device B, to which the free end of the belt is fastened in applying the inner belt to the waist. In using the inner belt the same is placed around the waist portion of the body after the shirt waist is put on. The belt is fastened to a convenient tightness. The skirt is then put on in the usual manner. The inner surface of the belt will directly engage the shirt waist and the outer surface of the belt will engage the inner surface of the skirt at the waistband. By reason of the yielding yet roughened surfaces of the belt a considerable friction is produced between the belt and the garments referred to, so that slipping of the latter is prevented.

Having thus described my invention, I claim as new and desire to secure by Letters Patent:

1. The herein-described method of making roughened rubber-faced fabrics, which consists in applying a rubber facing to a fabric body, applying a woven impression element in contact with the rubber facing, vulcanizing the rubber-faced fabric while in contact with the said impression element, and finally separating the said element from the vulcanized rubber facing of the fabric.

2. The herein-described method of making a roughened rubber-faced fabric, which consists in applying a rubber facing in the form of a single sheet to a plurality of fabric strips, applying an impression element in contact with the rubber facing, vulcanizing the rubber-faced fabric while in contact with said impression element, and finally tearing the adjacent strips of fabric apart.

3. The herein-described method of producing a roughened rubber-faced belting, which consists in supporting a plurality of fabric strips side by side with their edges in contact, applying a rubber facing to all the strips so supported, whereby the strips and rubber facing form a coherent web, applying a woven impression element to the entire outer surface of the rubber facing, vulcanizing the web while in contact with the impression element, and finally severing the rubber facing of the web along the edges of the said fabric strip.

4. The herein-described method of producing a roughened rubber-faced belting, which consists in supporting a plurality of tapes in the same plane and side by side, with the edges of adjacent tapes approximately in contact, applying a rubber facing to all the tapes so supported, winding the rubber-faced tapes together with a woven impression element, subjecting the wound tapes and impression element to vulcanization, unwinding the tapes and impression element, and finally separating adjacent tapes from each other.

5. The herein-described method of producing a roughened rubber-faced belting, which consists in applying a rubber facing to a fabric strip, winding the rubber-faced strip and a woven impression element together on a mandrel, vulcanizing the rubber-faced strip while in contact with the impression element, and finally separating the impression element from the vulcanized strip.

6. As an article of manufacture, a rubber-faced belting consisting of a fabric body, a rubber facing vulcanized thereon, the outer surface of the facing having depressions and sharp ridges between adjacent depressions, said depressions and ridges forming the counterpart of the surface of a woven fabric maintained in contact with the rubber facing during vulcanization.

In testimony whereof I have signed my name to this specification in the presence of two subscribing witnesses.

RUSSELL PARKER.

Witnesses:
C. BRADWAY,
EDWARD KOBBE.